United States Patent Office 2,922,783
Patented Jan. 26, 1960

2,922,783
PREPARATION OF SUGAR DERIVATIVES

Richard Kuhn and Werner Kirschenlohr, Heidelberg, Germany, assignors to American Home Products Corporation, County of New York, N.Y., a corporation of Delaware No Drawing. Application October 5, 1956
Serial No. 614,060

18 Claims. (Cl. 260—211)

Our invention relates to a new and improved process for preparing derivatives of sugars, more particularly for the preparation of 2-desoxy-2-amino sugars. It is also concerned with certain novel chemical compounds thereby produced which are valuable as intermediates in the preparation of drugs, bacterial growth substances, specific blood group substances, other substances possessing biological activity and for other purposes.

We have now found that 2-desoxy-2-amino sugars and their derivatives, which could not previously be synthesized on the industrial scale by means of presently-available methods, may be readily prepared by the hydrogenation under acid conditions of the reaction products resulting from reacting together a reducing sugar, hydrocyanic acid and either ammonia or a primary amine. A reducing sugar, as known to chemists, is a saccharide which contains a free or potential aldehyde or keto group, such reducing sugars being capable of reducing copper or silver salts in alkaline solution. Among the primary amines that we have successfully utilized in producing the intermediate products which are subjected to hydrogenation in accordance with our novel process, the aryl and aralkyl amines, such, for example, as benzylamine, aniline, p-toluidine, naphthylamine, etc. are especially satisfactory since the use of these amines permits the preparation of final products containing a free amino group during the subsequent hydrogenation.

We have discovered that the N-substituted glycosylamines resulting from the reaction of the reducing sugar and ammonia or primary amine generally need not be isolated for the subsequent hydrocyanic acid addition, and that they can be prepared more easily and in better yields than the 1-amino sugars. However, the 1-amino sugars may also be used in the preparation of 2-desoxy-2-amino sugars in accordance with our process.

Ordinarily catalytic hydrogenation using gaseous hydrogen and a hydrogenation catalyst is preferred because the acid concentration employed can be sufficiently low so that no splitting of the glycosidic linkages of di- and higher polysaccharides occurs. However, hydrogenation under more acid conditions utilizing other hydrogenating agents, such as zinc dust and acid, may also be employed, especially in the case of monosaccharides.

A catalyst suitable for use in the catalytic hydrogenation may be conveniently prepared by dissolving palladium chloride in 0.1 N sulfuric acid in accordance with the process described by Kuhn and Haas, Angew. Chem., 67 (1955), page 785. This solution is poured into 0.1 N barium hydroxide solution. Barium sulfate containing palladium oxide precipitates out and is used as the catalyst. Hydrogenation is ordinarily accomplished in from 20 to 30 minutes using hydrogen at atmospheric pressure and this PdO on $BaSO_4$ catalyst.

The acid concentration maintained during the catalytic hydrogenation may preferably be of the order of 0.5 N to 1.0 N, 0.5 N and 1.0 N hydrochloric acid being especially suitable.

The reaction product of a reducing sugar, hydrocyanic acid and a primary amine, more especially an aryl or aralkyl amine, readily absorb two mols of hydrogen when hydrogenated under acid conditions as, for example, by being subjected to the action of gaseous hydrogen in the presence of a hydrogenation catalyst. One mol of the hydrogen supplied is utilized in the formation and splitting off of the hydrocarbon residue of the amine, while the other mol is absorbed by the nitrile group. The absorption of two mols of hydrogen per nitrile group, with the resulting formation of a methyleneamino group, which might ordinarily be expected to occur, surprisingly, does not take place in our process.

In accordance with our improved method it is possible to convert aldoses into the corresponding 2-desoxy-2-aminoaldoses having an additional carbon atom very easily, the yields being especially high. For example, L-glucosamine may be prepared in this way from L-arabinose. The new method is also applicable to disaccharides, trisaccharides and even to other higher polysaccharides, since glycosidic bonds are not attacked under the conditions of acidity employed in the catalytic hydrogenation. The wide range of usefulness of the improved process constitutes an outstanding advantage thereof.

The resulting 2-desoxy-2-amino sugars, which can now be easily prepared on the industrial scale and in high yields by the improved method herein described, are valuable as intermediates in the preparation of drugs, particularly for preparing drugs possessing antibiotic activity. They are also valuable as intermediates for the production of bacterial growth substances, as well as building stones for specific blood group substances.

Those products prepared in accordance with the improved process wherein the nitrogen atom of the 2-desoxy-2-amino-sugar is subsequently acylated may be mentioned as particularly useful. Some of these products, for example, possess biological activity, such as activity for promoting the growth of the microorganism *Lactobacillus bifidus*.

The chemical changes which take place in carrying out our process can be explained as follows. We have found that amino sugars can be easily obtained by catalytically hydrogenating the corresponding amino nitriles (compounds having linkages I or III below) in dilute acid solution, in which connection only one mol of hydrogen is absorbed by the cyano group. The amine stage (compound II) is either taken up by hydroxyl groups in the gamma and delta positions forming a cyclic glycosylamine (IV), or the amino nitrile is itself cyclically degraded (III) and can only be converted to (IV) which, as a result of the action of the dilute hydrochloric acid gives the amino sugar hydrochloride (V) splitting off $NH_4Cl$. In any event the absorption of hydrogen stops at 1 mol.

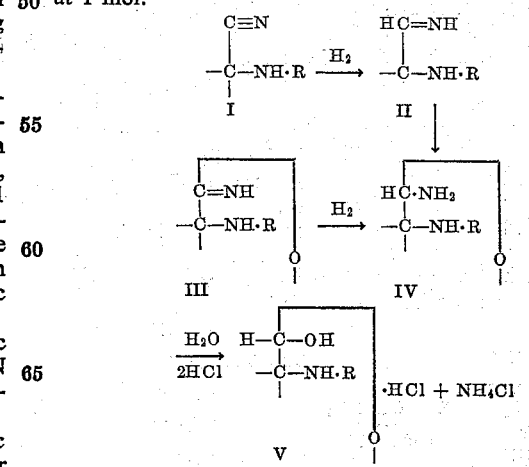

When ammonia is utilized in forming the intermediate product which is subjected to hydrogenation, R represents H in the above generic formulae. In this case only one mol of hydrogen is absorbed since there is no hydrocarbon residue to be split off (as is the case when a primary amine is utilized). When a primary amine such, for example, as benzylamine, is utilized R represents $C_6H_5 \cdot CH_2$ in the above generic formulae. In the latter case during the hydrogenation 2 mols of hydrogen are absorbed, one mol being utilized in the semi-hydrogenation of the nitrile group, and the other for splitting off the hydrocarbon residue from the amine (i.e. toluene in the case of benzylamine). However, only one mol is absorbed at the cyano group as previously pointed out.

Our process, which proceeds easily and rapidly and results in high yields, can be applied to disaccharides and higher polysaccharides since the use of concentrated hydrochloric acid is avoided.

The addition products which we subject to hydrogenation under acid conditions are characterized by containing the cyano and amino (or substituted amino) radicals attached to the same carbon atom, which need not, however, be the terminal carbon atom of the chain. One mol of hydrogen is absorbed for the cyano (CN) group. However, as previously stated, hydrogen may also be absorbed at another point in the molecule as, for example, to remove a hydrocarbon residue from the substituted amino group.

The surprising fact that only one mol of hydrogen is absorbed at the cyano group during hydrogenation can best be explained by the cyclic nature of the sugar derivatives which are subjected to hydrogenation. These compounds may be generically represented as including either one of the following configurations.

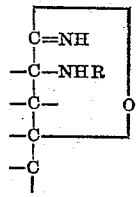   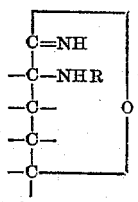

gamma-hydroxy compound   delta-hydroxy compound

Because of their cyclic nature only one mol of hydrogen is utilized during the hydrogenation of the nitrile to form the $C-NH_2$ linkage. Broadly considered, therefore, our process involves a new method for the preparation of aldehydes from gamma- or delta-hydroxy nitriles.

Previously when it was desired to convert the reaction product of a reducing sugar, hydrocyanic acid and a primary aliphatic amine (methylamine) to a 2-desoxy-2-amino sugar derivative, the reaction product was first hydrolyzed with concentrated acid to the acid, the CN group being converted to COOH. This was then lactonized and reduced with sodium amalgam with the absorption of two mols of hydrogen, thereby forming the desired substituted 2-desoxy-2-amino sugar (i.e. N-methyl-L-glucosamine). This process involved the additional steps of forming the acid by hydrolysis of the cyano group and lactonization, and required, as well, isolation of the intermediate products. Our process involving the addition of only one mol of hydrogen at the cyano group, with its fewer steps and the possibility of proceeding without isolation of intermediates, is much more satisfactory and results in considerably higher yields.

As applied to the preparation of L-glucosamine hydrochloride, for example, starting with L-arabinose, benzylamine and hydrocyanic acid, the reactions occurring in our process may be indicated as follows:

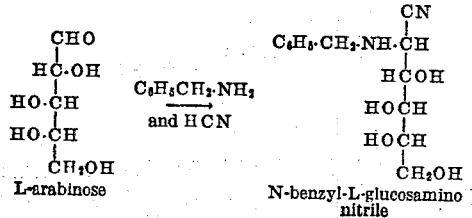

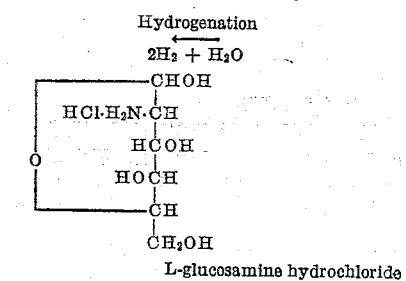

L-glucosamine hydrochloride

When L-arabinose is reacted with ammonia and hydrocyanic acid, L-glucosamino nitrile is formed. Upon hydrogenation under acid conditions, such as catalytically, L-glucosamine hydrochloride results.

Our process is also especially suitable for the preparation of the compound 4-O-β-D-galactopyranosyl-N-acetyl-D-glucosamine, a compound having the formula:

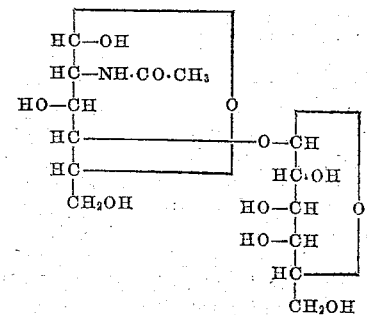

This compound, which is also called N-acetyl lactosamine and is so termed in the illustrative examples which follow, is of interest as possessing activity to support the growth of the microorganism Lactobacillus bifidus, especially Lactobacillus bifidus var. Penn.

This compound, 4-O-β-D-galactopyranosyl-N-acetyl-D-glucosamine (N-acetyl lactosamine) is readily prepared in accordance with our process from 3-O-β-D-galactopyranosyl-D-arabinose which, in turn, may be prepared from lactose. For example, lactose may first be oxidized to 3-O-β-D-galactopyranosyl-arabonic acid. This may be carried out by treatment of the lactose with air or some other oxidizing agent (see Hardegger et al., Helvetica Chim. Acta (1952), 35, page 618). By reduction of this acid using methods reported in the literature by Hudson, Isbell and Zemplen, 3-O-β-D-galactopyranosyl-D-arabinose is formed. This is then readily reacted with hydrocyanic acid and ammonia or a primary aryl or aralkyl amine, as herein described, to form the desired addition compound, 4-O-β-D-galactopyranosyl-D-glucosamine nitrile. By acid hydrogenation of this compound, such as by catalytic hydrogenation in acid solution (e.g. hydrochloric acid), together with hydrolysis, 4-O-β-D-galactopyranosyl-D-glucosamine is formed. The latter can be acetylated in the conventional manner, using acetic anhydride for example, to form 4-O-β-D-galactopyranosyl-N-acetyl-D-glucosamine (N-acetyl lactosamine).

The chemical changes occurring in this series of reactions may be indicated as follows:

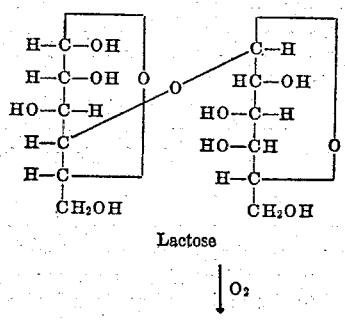

Lactose

↓ $O_2$

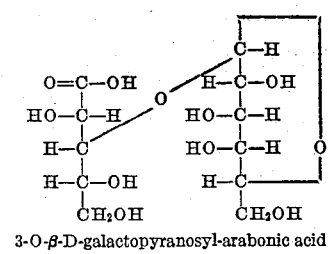

3-O-β-D-galactopyranosyl-arabonic acid

Hydrogenation ↓

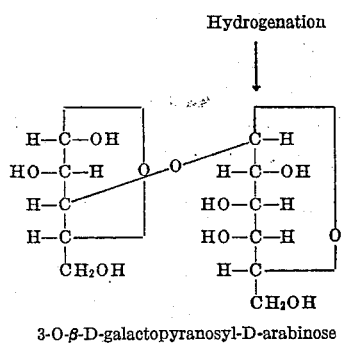

3-O-β-D-galactopyranosyl-D-arabinose

↓ NH₃ or primary amine (R·NH₂) and HCN

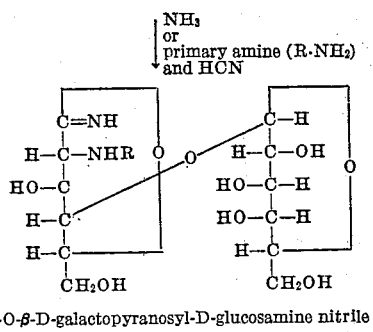

4-O-β-D-galactopyranosyl-D-glucosamine nitrile (When NH₃ is employed, R represents hydrogen. When a primary amine is employed, R represents the hydrocarbon residue attached to the NH₂ group of the amine.)

Hydrogenation under acid conditions and hydrolysis ↓

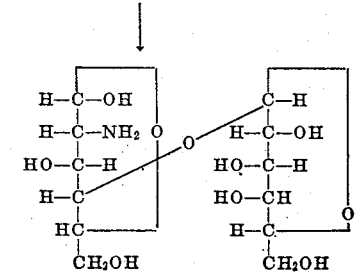

4-O-β-D-galactopyranosyl-D-glucosamine

Acetylation ↓

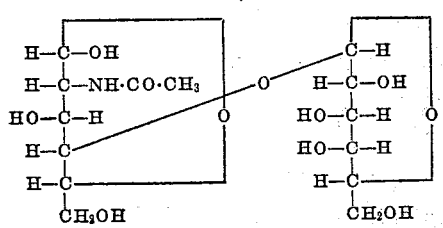

4-O-β-D-galactopyranosyl-N-acetyl-D-glucosamine(N-acetyl lactosamine)

Alternatively, lactose may first be converted to lactobionic acid by treatment with bromine and the latter oxidized, as with hydrogen peroxide in the presence of ferric iron, to 3-O-β-D-galactopyranosyl-D-arabinose. These reactions, which are described in the literature, may be represented as follows:

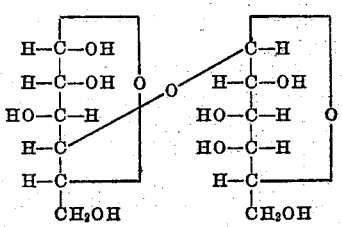

Lactose

Bromine ↓

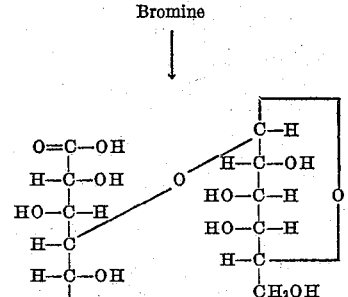

Lactobionic acid

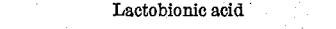

$H_2O_2$ Fe*** ↓

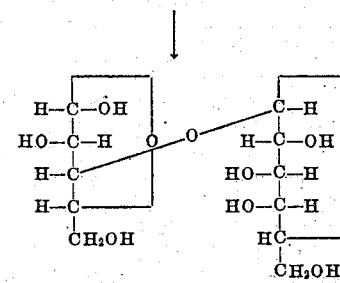

3-O-β-D-galactopyranosyl-D-arabinose

From 3-O-β-D-galactopyranosyl-D-arabinose the route to 4-O-β-D-galactopyranosyl-N-acetyl-D-glucosamine (N-acetyl-lactosamine) is the same as that given above in the first representation of our complete process for making this compound starting from lactose.

As illustrative of our invention, the following examples are given.

EXAMPLE 1

*Preparation of L-glucosamine-hydrochloride via N-benzyl-L-arabinosylamine*

*N-benzyl-L-arabinosylamine.*—5 grams of L-arabinose are formed into a suspension in 15 cc. of absolute ethyl alcohol, treated with 4 cc. of benzylamine and heated on a steam bath until everything has dissolved (5 to 10 minutes). The solution is now allowed to cool, and after several hours there is obtained a crystalline product which is filtered under suction and washed with ethyl alcohol. The yield is 5.5–6.0 grams (69–75% of the theoretical yield). The substance is recrystallized from a mixture of ethyl alcohol and ether. The product melted at 113–115° C.

$C_{12}H_{17}O_4N$ (molecular weight, 239.26). Calculated: C, 60.24; H, 7.16; N, 5.85. Found: C, 59.91; H, 7.21; N, 5.88.

$[\alpha]_D^{22} = 21.6° \rightarrow -0.9°_{t=1}$ hr. (c.=1; dimethyl formamide).

*N-benzyl-L-glucosamino acid nitrile.*—5 grams N-benzyl-L-arabinosylamine are dissolved in 30 cc. of warm absolute ethyl alcohol. The solution is cooled rapidly to room temperature and 2 cc. of anhydrous hydrocyanic acid are added. After about 5 minutes, the nitrile commences to crystallize out. The yield is 5.2 grams (93% of the theoretical yield). It is recrystallized from absolute ethyl alcohol. The melting point of the product was 130 to 132° C.

Crystal form: leaflets (infrared spectrum indicates —C≡N— group). Crude product $[\alpha]_D^{24}=-31°$ (c.=1 pyridine). After recrystallization $[\alpha]_D^{22}=-20°$ (pyridine) (c.=1.0). $[\alpha]_D^{22}=16.3°$.

$C_{13}H_{18}O_4N_2$ (molecular weight, 266.29). Calculated: C, 58.63; H, 6.81; N, 10.52. Found: C, 58.69; H, 6.96; N, 10.50.

*N-benzyl-L-glucosamino acid nitrile without isolation of the N-benzyl-L-arabinosylamine*

L-glucosamine hydrochloride.—For the catalytic hydrogenation, see Angew. Chem., 67, 786, (1955). This was carried out as follows. Two parts of the N-benzyl-L-glucosamino acid nitrile were added to 50 parts by weight of 0.5 N aqueous hydrochloric acid. The N-benzyl-L-glucosamino acid nitrile was then hydrogenated, utilizing gaseous hydrogen with 0.2 part of palladium oxide as the hydrogenation catalyst. Within the course of one hour two moles of hydrogen were absorbed. The solution was then filtered to remove the catalyst and concentrated by evaporation. Upon concentration, pure L-glucosamine hydrochloride immediately crystallized out in the analytically pure state. Its optical rotation was $[\alpha]_D^{22}=-97°\rightarrow-70.3°$ (c.=1.0 in water).

From the mother liquor of glucosamine hydrochloride crystallizate, further substance can be isolated by means of exchangers. The mother liquor is neutralized with anion exchangers, and the solution is added to a cation-exchanger column (Amberlite I.R. 120H). Ammonium ions and amino sugars are retained. The column is washed with water until the eluate is neutral. Thereupon hexosamine is first of all displaced from the exchanger by 1 N hydrochloric acid. The eluate is tested with Nessler's reagent for $NH_4Cl$, which only appears when the main portion of the amino sugar is extracted. The ammonium-chloride-free solution is then concentrated by evaporation. From the syrup which remains, further glucosamine hydrochloride can be caused to crystallize by addition of methyl alcohol. The total yield is thereby increased to 70 to 75%. By means of paper chromatography, there can be noted in the mother liquor slightly above glucosamine hydrochloride a substance which assumes a violet color with ninhydrin, which was identified as mannosamine hydrochloride. The solvent for the paper chromatography was acetic ester:pyridine:water (50:35:15) [see Malyoth and Stein: Biochem. Z., 322, p. 165 (1951)].

EXAMPLE 2

*Preparation of L-glucosamine hydrochloride via N-aryl-L-arabinosylamines*

N-phenyl-L-glucosamino acid nitrile.—5 grams L-arabinose are heated with 3.15 grams anilin and 9 cc. absolute ethyl alcohol on a steam bath until complete solution has taken place. This requires 10 to 15 minutes. After cooling to room temperature, 5 cc. of anhydrous hydrocyanic acid are added. After about 30 minutes 7.0–7.6 grams (84–90% of the theoretical yield) of N-phenyl-L glucosamino acid nitrile precipitates out. The product melted at 150 to 152° C.; browning starting at 140° C. The substance was recrystallized from methyl alcohol (needles).

$C_{12}H_{16}O_4N_2$ (molecular weight, 252.26). Calculated: C, 57.13; H, 6.39; N, 11.11. Found: C, 57.20; H, 6.39; N, 10.98.

Crude product: $[\alpha]_D^{23}=-110°$ (c.=1.1, pyridine). After recrystallization: $[\alpha]_D^{22}=-151°$ (c.=1.16, pyridine). $[\alpha]_D^{22}=-155°$.

*N-phenyl-L-arabinosylamine*

L-glucosamine-hydrochloride.—5 grams N-phenyl-L-glucosamino acid nitrile are formed into a suspension in 100 cc. of 0.5 N HCl and catalytically hydrogenated with 4 grams PdO on $BaSO_4$ which has previously been hydrogenated in neutral solution [see article of Kuhn and Haas, Angew. Chem., 67, p. 785 (1955)]. After absorption of 3 mols of hydrogen (7 hours) the hydrogenation is stopped, and the catalyst is removed by centrifuging. The centrifuged substance is now freed from the cyclohexanone formed in the hydrogenation by shaking with ether or by extraction in an extractor. The cyclohexanone was isolated (50 to 55% of the theoretical yield) and identified as its 2,4-dinitro-phenyl hydrazone.

The acid, ether-treated solution upon concentration by evaporation gives a crystalline residue which is ground with methyl alcohol and suction filtered: The yield was 2.8 grams (66% of the theoretical yield).

The mother liquor is diluted with water, neutralized with anion exchanger by the batch process (Amberlite I.R. 45) and the filtered solution, concentrated to about 30 cc., is added to a cation exchanger column (60 cc. Amberlite I.R. 120). Both these Amberlite resins are made by Rohm and Haas Co. By proceeding further in the manner described above, there is obtained from the hydrochloric acid eluate an additional 0.1 gram of crystalline product. The total yield of L-glucosamine-hydrochloride was 68% of the theoretical yield.

The mother liquor, as could be determined by paper chromatography, contains mannosamine hydrochloride in addition to glucosamine-hydrochloride.

EXAMPLE 3

*Preparation of L-glucosamine hydrochloride*

N-p-tolyl-L-glucosamino acid nitrile.—4.5 grams L-arabinose are heated in 12 cc. ethyl alcohol with 3.3 grams p-toluidine on a steam bath until a clear solution is produced. (This requires 25 to 30 minutes.) The solution is cooled to room temperature and 5 cc. of anhydrous hydrocyanic acid is added. After a few minutes, the crystallization of the nitrile begins, the nitrile being suction filtered after a few hours and washed with ethyl alcohol. The yield was 6.8–7.2 grams (85–90% of the theoretical yield).

The substance is recrystallized in ethyl alcohol. This gave colorless needles of a product melting at 155 to 156° C. (decomposition). The nitrile begins to sinter at 150° C. gradually assuming a brown color. Crude product $[\alpha]_D^{22}=-115°$, (c.=1, pyridine); after recrystallization $[\alpha]_D^{22}=-148°$ (c.=1, pyridine).

$C_{13}H_{18}O_4N_2$ (molecular weight, 266.29). Calculated: C, 58.63; H, 6.81; N, 10.52. Found: C, 58.44; H, 6.72; N, 10.75.

L-glucosamine-hydrochloride.—5 grams N-p-toly-L-glucosamino acid nitrile are catalytically hydrogenated in the same manner as N-phenyl-L-glucosamino acid nitrile in 110 cc. of 0.5 N hydrochloric acid with 4 grams PdO on $BaSO_4$. Upon the same purification of the hydrogenated solution, there are obtained 2.6–2.9 grams (65–71% of the theoretical yield) of L-glucosamine-hydrochloride.

$[\alpha]_D^{23}=-85.6°$ (t=5 min.)$\rightarrow-70.5°$ (t=20 hours), c.=0.9 (water).

$C_6H_{13}O_5N \cdot HCl$, calculated: C, 33.42; H, 6.54; N, 6.50. Found: C, 33.67; H, 6.33; N, 6.68.

EXAMPLE 4

*Preparation of L-glucosamine hydrochloride via 1-amino-L-arabinose*

L-glucosamino acid nitrile.—5 grams 1-amino-L-arabinose [see Isbell and Frush, NBSJ Research, 46, p. 132 (1951)] are formed into a suspension in 40 cc. of pyridine. There are then added 7 cc. of anhydrous hydrocyanic acid and the reaction mixture is shaken for about 8 hours. Thereupon the light yellow solution is evaporated in vacuum. The syrupy residue crystallizes upon grinding with a small amount of methyl alcohol (platelets). The yield of L-glucosamino acid nitrile was 3.2 grams (54% of the theoretical yield). Recrystallization in methyl alcohol or pyridine/methyl alcohol/ether mixture caused considerable loss. The product melted at 101–103° C. The infra-red spectrum clearly shows the intact —C≡N-group.

$C_6H_{12}O_4N_2$ (molecular weight, 176.17). Calculated: C, 40.90; H, 6.87; N, 15.90. Found: C, 41.06; H, 6.86; N, 16.07.

*L-glucosamino-hydrochloride.*—5 grams L-glucosamino acid nitrile are hydrogenated in 120 cc. of 0.5 N HCl with 1 gram of Pd on $BaSO_4$, 1 mol of hydrogen being absorbed in about 1 hour (final value). Upon concentration, there immediately crystallized out 4.0 to 4.5 grams (65–74% of the theoretical yield) of L-glucosamino hydrochloride.

$[\alpha]_D^{22} = -96.4°$ (4 min.) → $-72.3°$ (c.=1.1 in water). Calculated: N, 6.50. Found: N, 6.77.

EXAMPLE 5

Preparation of 2-desoxy-2amino-D-galaheptose hydrochloride from galactose

*N-benzyl-D-gala-heptosamino acid nitrile.*—5.4 grams of D-galactose are heated on a steam bath with 4 cc. of benzylamine and 10 cc. of absolute ethyl alcohol until complete solution occurs. This requires 20 to 30 minutes. The light yellow solution is then cooled to room temperature and 3 cc. of anhydrous hydrocyanic acid are immediately added. After a few minutes, the crystallization of the N-benzyl-D-heptosamino acid nitrile commences. After a few hours the product is removed by filtration under suction, and washed with ethyl alcohol. The yield was 6.2 grams (70% of the theoretical yield). It can be recrystallized from ethyl alcohol. The melting point was 131–133° C. (flat, small bars). $[\alpha]_D^{22} = -12.8°$ (c.=1, pyridine).

$C_{14}H_{20}O_5N_2$ (molecular weight, 296.32). Calculated: C, 56.74; H, 6.80; N, 9.45. Found: C, 56.84; H, 6.95; N, 9.38.

*D-galaheptosamino-hydrochloride.*—6 grams of N-benzyl-D-heptosamino acid nitrile are dissolved in 50 cc. of 1 N hydrochloric acid and hydrogenated with 2.5 grams of PdO on $BaSO_4$ which has been previously hydrogenated in neutral solution. After an hour 2 mols of hydrogen had been absorbed and hydrogenation was terminated. The solution, filtered to remove the catalyst, was concentrated by evaporation. The ammonium chloride crystallizing out in the syrupy residue was suction filtered with a few cc. of concentrated hydrochloric acid. The filtrate is then concentrated in vacuum, and the syrup obtained is then dissolved in 10 cc. of methyl alcohol. The crystallization of the heptosamino-hydrochloride commences immediately and it is removed by suction filtering after several hours. The yield was 2.8 to 3.0 grams (56–61% of the theoretical yield). Recrystallization takes place by dissolving the compound in a small amount of water and adding methyl alcohol (rhombic leaflets).

$C_7H_{15}O_6N \cdot HCl$ (molecular weight, 245.65). Calculated: C, 34.21; H, 6.56; N, 5.69. Found: C, 34.34; H, 6.48; N, 5.43.

$[\alpha]_D^{24} = -77.5°$ → $-66.7°$ (final value after 48 hours); c.=1.3 (water); $R_{\text{glucosamine hydrochloride}} = 0.71$.

In the mother liquor there can be detected by paper chromatography slightly above the heptosamino-hydrochloride isolated a substance which gives a violet color with ninhydrin. Obviously, there is concerned the isomeric hydrochloride.

EXAMPLE 6

Synthesis of N-acetyl-lactosamine preparation of 4-β-D-galactoside-D-arabinose

[Degradation of lactose according to Zemplen, Ber, dtsch. Chem. Ges., 59, 2402 (1926); 60, 1309 (1927).]

*Lactose-oxime.*—180 grams of lactose monohydrate are added in the course of 30 minutes in small portions while stirring to a methanol hydroxylamine solution at a temperature of 65° C., the lactose passing into solution. It is left for a further hour at this temperature. The oxime separates out even while the solution is hot. After cooling, it is subsequently filtered off and washed with methyl alcohol. The yield was 154 grams. From the mother liquor, there crystallized out a further amount of 5 grams. The total yield was 89% of the theoretical yield.

The substance is dissolved in a small amount of water for its purification and caused to crystallize out by the addition of methyl alcohol. Melting point of the product, 183–185° C.

$[\alpha]_D^{22} = +38.3°$ (after 5 min.) → $+15.5°$ (after 25 hours), c.=1 (water).

$C_{12}H_{23}O_{11}N$ (molecular weight, 357.30). Calculated: C, 40.33; H, 6.49; N, 3.92. Found: C, 40.20; H, 6.62; N, 4.03.

*Octa-acetyl-lactobionic acid nitrile without isolation of the lactoseoxime.*—A solution of 180 grams of lactose in 300 cc. of water, diluted with 100 cc. of methyl alcohol is allowed to flow, with stirring, into a hydroxylamine solution at a temperature of 65° C. This was prepared from a sodium methylate solution (20 grams of sodium in 350 cc. of methanol) and a solution of 61 grams of hydroxylamine hydrochloride in 20 cc. of water, following the procedure described in the cited articles of Zemplen. The addition should be so regulated that no precipitation takes place. The solution is maintained for a further hour at 65° C. and thereupon evaporated in vacuum to a syrup. For removal of the water, it is concentrated two times more with methyl alcohol. The solution of the light yellow syrup in 220 cc. of pyridine is added, drop by drop, with strong stirring, over the course of one hour at 100° C. to a mixture of 180 grams of anhydrous sodium acetate and 1200 cc. of acetic acid anhydride. The reaction mixture is further maintained for one hour at 100° C., allowed to cool, and stirred into 8 liters of ice water. The brown oily residue is washed several times with cold water and dissolved in 750 cc. of ethyl alcohol. The alcoholic solution is slowly poured, with stirring, into 8 liters of ice water. The nitrile which precipitates in the form of a white powder is suction filtered, and washed carefully with water. The weight of the dried substance was 270 to 300 grams (80 to 89% of the theoretical yield). The nitrile is dissolved in hot benzene (2 parts) from which it is crystallized out with one mol of crystalline benzene. The melting point of the product was 90 to 93° C., sintering starting at 75° C.

$C_{28}H_{37}O_{18}N \cdot C_6H_6$ (molecular weight, 753.69). Calculated: C, 54.18; H, 5.75; N, 1.86. Found: C, 54.38; H, 5.78; N, 1.94.

After drying for 48 hours at 75° C. over $P_2O_5$ and paraffin (5 mm. Hg pressure) it was possible to obtain the substance free of benzene.

$C_{28}H_{37}O_{18}N$ (molecular weight, 675.45). Calculated: C, 49.77; H, 5.52; N, 2.07. Found: C, 49.85; H, 5.41; N, 2.03.

*Octa-acetyl-lactobionic acid nitrile from lactose-oxime.*—18 grams of anhydrous sodium acetate in 120 cc. of acetic acid anhydride are heated on a steam bath. 18 grams of lactose oxime are added thereto in small portions while stirring. The reaction mixture is stirred for another 2 hours at 90 to 100° C. After cooling, the crystal paste is poured slowly into 1 liter of ice water with strong centrifuging. The syrupy precipitate is dissolved in 100 cc. of methyl alcohol, and again stirred in 1.5 liters of ice water, a crystalline precipitate being obtained. It is suction filtered and washed thoroughly with water. The yield was 20 to 22 g. (59–65% of the theoretical yield).

3-β-D-galactosyl-D-arabinose.—To a solution of 75 grams of octaacetyl-lactobionic acid nitrile in 350 cc. of methyl alcohol, there are added 200 cc. of a 1 molar sodium methylate solution. The reaction mixture, in which an insoluble addition product has precipitated, is allowed to stand for 10 minutes at room temperature, whereupon it is poured into 110 cc. of 2 N acetate acid and immediately concentrated in vacuum to about 100 cc. The solution, diluted with 100 cc. water, is freed from cations in a column containing Amberlite I.R. 120 (Rohm and Haas Co.). The eluate is concentrated. The light yellow syrup is repeatedly evaporated with water in order to remove the acetic acid and finally dissolved in 30 cc. of methyl alcohol whereupon, after inoculation, 18–20 grams (58–64% of the theoretical yield) of galactosido-arabinose, $C_{11}H_{20}O_{10}$ (molecular weight, 312.27), crystallize out.

Further amounts of galactosido-arabinose can be obtained from the mother liquor as its N-phenyl-glycoside.

N-phenyl-3-β-D-galactopyranosyl-D-arabinosyl-amine.—6.2 grams of 3-β-D-galactopyranosyl-D-arabinose are suspended in 120 cc. of ethyl alcohol and, after the addition of 2 grams of aniline and 50 mg. of $NH_4Cl$, stirred on a water bath under reflux. After one and one-half to two hours the initial suspension has changed into a thin paste of fine small needles. It is allowed to cool and the N-phenyl-glycoside is filtered off. The yield is 6.9 grams (86% of the theoretical yield). It is recrystallized from an ethyl alcohol/water mixture. To a suspension of 1.5 grams of N-phenyl-glycoside in 20 cc. of boiling ethyl alcohol, there are added 5 cc. of water, whereupon solution takes place. Upon cooling, 1.2 to 1.3 grams of N-phenyl-3-β-D-galactopyranosyl-D-arabinosyl-amine crystallize out with 1 mol of water of crystallization. The product melted at 170–171° C.

$C_{17}H_{25}O_9N \cdot H_2O$ (molecular weight, 405.39). Calculated: C, 50.36; H, 6.71; N, 3.46. Found: C, 50.28; H, 6.63; N, 3.36.

$[\alpha]_D^{22} = +34.7°$ (c.=0.8, pyridine).

Rotation decreases in the course of several days, but after 3 hours no decrease could be noted.

$[\alpha]_D^{22} = +36°$ (4 days) $\rightarrow +7.5°$ (c.=1.03; dimethyl formamide).

$[\alpha]_D^{22} = -16°$ (after 10 min.) $\rightarrow -42°$ after 60 min. (c.=0.93; water).

Hydrolysis takes place very rapidly in water. Aniline can be detected, after shaking with ether, by the chloride of lime reaction and galactosidoarabinose can be determined by paper chromatography.

N-phenyl-3-β-D-galactopyranosyl-D-arabinosyl amine from syrups containing galactosidoarabinose.—From 41 grams of octa-acetyl-lactobionic acid nitrile, there are obtained, after degradation 14 to 16 grams of syrup. This syrup is dissolved in 40 cc. of methyl alcohol, 4.5 grams of aniline are added and the solution is boiled on a steam bath. After about 3 minutes the reaction mixture solidifies into a thick crystalline paste which, after cooling, is stirred with methyl alcohol and suction filtered. The reaction product is washed with methyl alcohol until the filtrate is colorless. The yield is 14 to 15 grams of N-phenyl-glycoside (55 to 60% of the theoretical yield).

3-β-D-galactopyranosyl-D-arabinose (by cleavage of N-phenyl-glycoside with benzaldehyde).—5 grams of the glycoside are dissolved in 250 cc. of hot water. 4 cc. of benzaldehyde are added to the solution, and it is thereupon heated for 20 minutes on the steam bath with stirring. After cooling, the aqueous solution is extracted with ether and concentrated in vacuum. The syrup which remains is taken up in about 7 cc. of methyl alcohol and inoculated. After 24 hours, from 2.5 to 2.8 grams of galactosidoarabinose have crystallized out (65 to 72% of the theoretical yield).

N-benzyl-3-β-D-galactopyranosyl-D-arabinosylamine.—6.2 grams of 3-β-D-galactosido-D-arabinose are heated in 15 cc. of absolute ethyl alcohol with 2.4 cc. of benzylamine on a steam bath until everything has dissolved. (This requires 15–20 minutes.) Thereupon the solution is diluted with 25 cc. of ethyl alcohol. Upon cooling there crystallize out 6.3 grams (79% of the theoretical yield) of N-benzyl-glycoside, which can be recrystallized in ethyl alcohol. The substance sinters starting at 107° C. with a brown discoloration. The melting point is 125–126° C.

$[\alpha]_D^{22} = -20° \rightarrow -29°$ (after 24 hours); c.=0.95 (pyridine).

$C_{18}H_{27}O_9N$ (molecular weight, 401.40). Calculated: C, 53.86; H, 6.78; N, 3.49. Found: C, 53.87; H, 7.01; N, 3.31.

Degradation of lactose by the Ruff method

N-phenyl-3-β-D-galactopyranosyl-D-arabinosylamine.— Using as basis the method described by H. L. Frush and H. S. Isbell, N.B.S.J. Research, 50 (1953), p. 133, a mixture of 100 grams of calcium lactobionic monohydrate, 5 grams of barium acetate and 2.5 grams of pulverized ferrous sulfate heptahydrate was stirred in 750 cc. of boiling water. The solution, after cooling to 35° C. was added in a thin jet to 30 cc. of 30% hydrogen peroxide with stirring or shaking. The temperature should not be more than 40° C. After 45 minutes a further 30 cc. of 30% hydrogen peroxide was added. The barium sulfate precipitate was removed by suction filtering after 3 hours and the filtrate evaporated to the thinly liquid dark brown syrup. From the latter calcium salts (35 to 42 grams) were precipitated with about 500 cc. of methyl alcohol. It is advisable in connection with this precipitation first of all to add the methyl alcohol slowly and in very small portions. It may then be suction filtered. The almost colorless filtrate was further purified by the addition of about 40 cc. of a 9% aqueous oxalic acid solution, which precipitates further calcium. By centrifuging small portions, it is possible to determine whether the precipitation is complete. The slimy precipitate was removed by centrifuging (15 minutes, 3000 r.p.m.); the completely colorless centrifuged product was de-ionized in a column containing 70 to 80 cc. of anion exchanger (Amberlite I.R. 45) and concentrated to a viscous syrup. This syrup was dissolved in 50 cc. of methyl alcohol, whereupon 14 grams of aniline were added, followed by heating on the steam bath to the boiling point. After 3 to 5 minutes the reaction mixture solidified, forming a thick crystalline paste which, after 2 to 3 hours of ice-cooling, was stirred with methyl alcohol, suction filtered and washed with methyl alcohol until the filtrate had become entirely colorless. The yield was 35 to 40 grams.

The purification with oxalic acid can be replaced by de-ionization with cation and anion exchangers. From the eluates concentrated to a syrup, there is obtained crystalline galactosidoarabinose by dissolving in methyl alcohol and inoculation.

N-acetyl-lactosamine from N-phenyl glycoside

HCN-addition.—A solution of 40 grams of N-phenyl-3-β-D-galactopyranosyl-D-arabinosylamine in 150 cc. of dimethylformamide was treated with 8 cc. of anhydrous hydrocyanic acid and heated to 80° C. on a water bath. 6 cc. of hydrocyanic acid was added after the first hour and after the second hour, and the amber-yellow solution was evaporated in vacuum after two and one-half hours, the residue being dissolved in methyl alcohol and again concentrated to a thick syrup.

Hydrogenation.—The syrup was dissolved in 100 cc. of water. After addition of 110 cc. of 2 N hydrochloric acid, the solution was catalytically hydrogenated with 20 grams of PdO on $BaSO_4$ previously hydrogenated in neutral solution. After absorption of 3 mols of hydrogen (24 hours), the hydrogenation was terminated. The catalyst was centrifuged off from the solution and the centrifuged substance freed from the main portion of the cyclohexanone produced during the hydration by shaking 3 times with ether. The colorless solution, neutralized by stirring with anion exchanger (Amberlite I.R. 45), was concentrated in vacuum to a syrup.

*N-acetylation.*—The syrup was dissolved with 17.2 grams of anhydrous sodium acetate in 160 cc. of water/methyl alcohol mixture (1:1). Instead of sodium acetate, 28 cc. of triethylamine could also be employed. 24 cc. of acetic anhydride was added, with cooling. After standing for 24 hours at room temperature, the reaction solution was concentrated in vacuum and the viscous syrup obtained dissolved in about 130 cc. of water. The cations were removed in a cation exchanger column (300 cc. Amberlite I.R. 120; Rohm & Haas Co.). The acid eluate was neutralized with anion exchanger (Amberlite I.R. 45) by the batch process. The solution, decolorized with Carboraffin decolorizing carbon, was concentrated to a syrup and dissolved in 100 cc. of methyl alcohol. After 48 hours at 0° C., 17 to 18 grams of N-acetyl-lactosamine crystallized out (41 to 43% of the theoretical yield referred to N-phenyl-glycoside). Recrystallization was effected by dissolving in a small amount of water and adding methyl alcohol. Melting point of the compound, 168–170° C.

$[\alpha]_D^{22} = +50.5° \rightarrow +28.5°$ (c.=1, water).

$C_{14}H_{25}O_{11}N \cdot CH_3OH$ (molecular weight, 415.4). Calculated: C, 43.37; H, 7.03; N, 3.37; $HOCH_3$, 7.70. Found: C, 43.36; H, 7.12; N, 3.21; $HOCH_3$, 7.35.

The substance agrees in all its properties (melting point, mixed melting point, infra-red spectrum, rotation, paper chromatographic migration velocity) with the disaccharide N-acetyl-lactosamine as isolated from the blood group substances of meconium and subsequently synthesized in a different manner and characterized. See the papers of R. Kuhn and W. Kirschenlohr, Chem. Ber., 87, pages 560 and 1547 (1954).

*N-acetyl-lactosamine from N-benzylglycoside.*—To a suspension of 4.02 grams of N-benzyl-3-β-D-galactopyranosyl-D-arabinosyl-amine in 30 cc. of absolute ethyl alcohol, 4 cc. of anhydrous hydrocyanic acid were added. After 15 minutes, a clear solution was obtained which after 5 hours was concentrated under vacuum to a syrup. The syrup was dissolved in 50 cc. of 0.5 N hydrochloric acid and hydrogenated catalytically with 2 grams of PdO on $BaSO_4$ which had previously been hydrogenated in neutral solution. See Kuhn and Haas, Angew. Chem., 67, 785 (1955). After the absorption of 2 mols of hydrogen requiring 1 hour, the hydrogenation was complete. The solution freed from the catalyst was neutralized with anion exchanger and concentrated. The syrup was dissolved with 1.7 grams of anhydrous sodium acetate in 15 cc. water/methyl alcohol mixture (1:1). The solution was treated with 2.4 cc. of acetic anhydride and concentrated after 24 hours. The residue was dissolved in 10 cc. of water and de-ionized with cation and anion exchangers as described above. Thereupon it was again concentrated and dissolved in 15 cc. of methyl alcohol, from which from 1.4 to 1.6 grams of N-acetyl-lactosamine crystallized out (34 to 39% of the theoretical yield).

*4-β-D-galactosyl-β-methyl-2-desoxy-2-acetamino-glucopyranosyl-(β-methyl-N-acetyl-lactosaminide)*

To a solution of 6.2 grams of N-acetyl-lactosamine in 75 cc. of water, there was added 250 cc. of methyl alcohol. The solution was then cooled to 0° C. Into this there was poured a cold (0° C.) ethereal diazomethane solution, which was prepared from 40 grams of nitrosomethylurea and distilled (Organic Synthesis, XV, 3, 1935). After 12 hours the colorless solution was evaporated, the syrup was dissolved in 50 cc. of water, 120 cc. of methyl alcohol were added and again mixed with an ethereal diazomethane solution (from 20 grams of nitrosomethylurea). After 24 hours, the solution was concentrated and the syrup dissolved in 10 cc. of methyl alcohol. Within the course of 24 hours, 0.65 gram of β-methyl-N-acetyl-lactosaminide crystallized out (11% of the theoretical yield). It was recrystallized in methyl alcohol. The product was in the form of colorless needles of melting point 243–245° C. (decomposition).

$[\alpha]_D^{22} = -23.1°$ (c.=0.86, water).

$C_{15}H_{27}O_{11}N$ (molecular weight, 397.37). Calculated: C, 45.34; H, 6.86; N, 3.53; $OCH_3$, 7.80. Found: C, 45.33; H, 6.90; N, 3.64; $OCH_3$, 7.87.

Only two substances could be found in the mother liquor by paper chromatography by the chlorine-benzidine reaction, namely, N-acetyl-lactosamine, and very close above it β-methyl-N-acetyl-lactosaminide. When non-distilled diazomethane solution was used in the synthesis, a third substance which could be colored by chlorine/benzidine was very clearly evident, this substance migrating somewhat more rapidly than the β-methylglycosaminide. In all probability there is here involved the α-methyl-N-acetyl-lactosaminide. N-acetyl-glucosamine, α- and β-methyl-N-acetyl-glucosaminide show a similar ratio of the migration velocities. See Kuhn, Zilliken and Gauhe, Chem. Ber., 86, 466, (1953).

EXAMPLE 7

*Galactoseamine-hydrochloride from N-phenyl-D-lyxosylamine*

*N-phenyl-D-lyxosylamine.*—3 grams of D-lyxose are heated with 2.1 grams of aniline in 50 cc. of absolute ethyl alcohol for 30 minutes under reflux. The solution is allowed to cool, whereupon the N-phenyl-glycoside which is crystallized out is removed by suction filtering and the mother liquor concentrated. The crystalline residue is formed into a suspension in ethyl alcohol and suction filtered. The total yield is 4.1 gram (91% of the theoretical yield). The substance is recrystallized in ethyl alcohol (platelets). Melting point of product was 145 to 146° C., browning starting at 140° C.

$[\alpha]_D^{22} = -153° \rightarrow -41.3°$. Final rotation after 20 hours, c.=1.2 (pyridine).

$C_{11}H_{15}O_4N$ (molecular weight, 225.24). Caluculated: C, 58.65 H, 6.71; N, 6.22. Found: C. 58.66; H, 6.65; N, 6.39.

*N-phenyl-D-galactosamino acid nitrile.*—To a solution of 4 grams of N-phenyl-D-lyxosyl amine in 50 cc. of ethyl alcohol, there are added 5 cc. of anhydrous hydrocyanic acid. After 24 hours, the solution is evaporated under vacuum and the residue ground with ethyl acetate. The crystals were suction filtered after 1 hour. The yield was 3.4 grams (75% of the theoretical yield). The compound was recrystallized in ethyl acetate (1.2 grams in 50 cc. of ethyl acetate). The product melted at 125–126° C.

$[\alpha]_D^{22} = +184°$. c.=1.16, pyridine.

$C_{12}H_{16}O_4N_2$ (molecular weight, 252.26). Calculated: C, 57.13; H, 6.39; N, 11.11. Found: C, 56.99; H, 6.53, N, 11.25.

*N-phenyl-D-galactosamino acid nitrile, without isolation of the N-phenyl-D-lyxosylamine.*—4.5 grams of D-lyxose are heated with 3 grams of aniline and 4 cc. of methyl alcohol on the steam bath. After 2 to 3 minutes, the lyxose has passed practically entirely into solution and the crystallization of the N-phenyl-D-lyxoside commences immediately. 10 cc. of ethyl alcohol are now added and left for a further 10 minutes at the boiling point. 6 cc. of anhydrous hydrocyanic acid are added to the cooled suspension. After shaking the reaction mixture for 24 hours, the crystals (4.0 grams) are removed by suction filtering and the filtrate concentrated to a syrup which, after dissolving in ethyl acetate, supplies, in addition, 2.8 grams of crystalline nitrile (total yield 90% of the theoretical yield).

*D-galactosamino-hydrochloride.*—N-phenyl-D-galactosamino acid nitrile (6 grams) was hydrogenated in 120 cc. of 0.5 N HCl with 5 grams of PdO on BaSO₄ which had previously been hydrogenated in neutral solution (Kuhn and Haas, Angew. Chem., 67, 785). The hydrogen absorption takes place in the manner described in connection with the hydrogenation of N-phenyl-L-glucosamino acid nitrile. The catalyst was centrifuged off after hydrogenation was complete. The solution, extracted with ether and neutralized with anion exchanger (Amberlite I.R. 45), was allowed to flow slowly through a cation exchanger column. The retained amino sugars were eluted with 1 N HCl after the column had been washed free of acid with water. Care is taken that the eluates do not contain any NH₄Cl (Nessler's reagent). Neutralization was effected by the use of an anion exchanger and the solution was evaporated to a thinly liquid syrup which was then diluted with 15 cc. of methyl alcohol. In 48 hours 0.8 gram of D-galactosamine hydrochloride crystallized out in the form of small rods. After evaporation of the mother liquor and stirring of the residue with methyl alcohol, further crystals were obtained so that the total yield increased to from 1.0 to 1.2 grams (19 to 23% of the theoretical yield).

$[\alpha]_D^{23} = +47.3°$ ($t=4$ min.) → $+91.5°$ ($t=6$ hours; see Levene, J. Biol. Chem., 57, 337, year 1923); c.=0.95 (water).

$C_6H_{13}O_5$ N·HCl (molecular weight, 215.6). Calculated: C, 33.42; H, 6.54; N, 6.50. Found: C, 33.39; H, 6.68; N, 6.64.

EXAMPLE 8

*Galactoseamine hydrochloride from 1-amino-D-lyxose*

*D-galactosamino acid nitrile.*—3 grams of 1-amino-D-lyxose (Levene et al., J. Bio. Chem., 22, p. 333, year 1915) were formed into a suspension in 20 cc. of pyridine, treated with 5 cc. anhydrous hydrocyanic acid and shaken at room temperature. After about one-half hour complete solution had occurred and the crystallization of the nitrile commenced. The nitrile was removed by suction filtering after shaking for 6 hours. The yield was 1.5 grams. From the mother liquor an additional 1.2 grams of crystals were obtained upon evaporation. The total yield was 76% of the theoretical yield. Melting point of product: 107–109° C. (decomposition). The optical rotation decreases from $[\alpha]_D^{23}=0$ (c.=0.9, pyridine) with brown discoloration of the solution.

$C_6H_{12}O_4N_2$ (molecular weight, 176.17). Calculated: C, 40.90; H, 6.87; N, 15.90. Found: C, 41.21; H, 6.67; N, 15.94.

The infra-red spectrum clearly shows the nitrile bands.

*D-galactosamine-hydrochloride.*—5 grams of D-galactosamino acid nitrile was hydrogenated in 120 cc. of 0.5 N hydrochloric acid with 4 grams of PdO on BaSO₄ previously hydrogenated in neutral solution: Kuhn and Haas, Angew. Chem., 67, 785. The further purification was effected in the same manner as described in connection with the hydrogenation of N-phenyl-D-galactosamino acid nitrile. The hydrogenated solution was not extracted with ether. The yield of D-galactosamine hydrochloride was 2.7 to 3.0 grams (44 to 50% of the theoretical yield).

$[\alpha]_D^{23} = +124.4°$ ($t=4$ min) → $+93.3°$ ($t=16$ hours).

$C_6H_{13}O_5$ N·HCl (molecular weight, 215.6). Calculated: C, 33.42; H, 6.54; N, 6.50. Found: C, 33.66; H, 6.30; N, 6.67.

EXAMPLE 9

5 grams of L-arabinose were heated with 12 cc. of absolute ethyl alcohol and 5 cc. of benzylamine for from 5 to 10 minutes, by which time everything had gone into solution. After cooling, 2.5 cc. of anhydrous hydrocyanic acid was added. After a short while a product in the form of rectangular scales started to separate out. The yield was 7.8 grams, or 88% of the theoretical. The product, N-benzyl-1-glucosaminonitrile, melted at 130–132° C.

Calculated for $C_{13}H_{18}O_4N_2$. C, 58.63; H, 6.81; N, 10.52. Found: C, 58.69; H, 6.96; N, 10.37.

The product was dissolved in 150 cc. of 0.5 N hydrochloric acid and hydrogenated with hydrogen gas, 0.8 gram of palladium oxide PdO being utilized as the hydrogenation catalyst. Two moles of hydrogen were absorbed over the course of 50 to 60 minutes (final value). Upon concentration, there immediately crystallized out from 3.5 to 3.8 grams (55 to 60% of the theoretical yield) of pure 1-glucosaminehydrochloride $C_6H_{13}O_5$ N·HCl Calculated: C, 33.42; H, 6.54; N, 6.50. Found: C, 33.39; H, 6.50; N, 6.65.

$[\alpha]_D^{22} = -97°$ ($t=0$) → $-70.3°$ (c.=1.0 in water).

The $R_f$ value was identical with that of d-glucosaminohydrochloride. An additional amount of the substance could be secured from the mother liquor after removal of the ammonium chloride found during the reaction.

In a similar manner d-xylose, d-lyxose, 3-β-d-galactosido-d-arabinose, d-glucose and d-galactose can be converted into the 2-desoxy-2-amino sugars having an additional carbon atom. The synthesis of the amino nitriles can be carried out in two stages; first reaction with ammonia or the aryl or aralkyl primary amine, and then addition of hydrocyanic acid.

EXAMPLE 10

The acid nitrile of L-glucosamine (melting point 100–102° C.) was prepared by reacting L-arabinose with hydrocyanic acid and ammonia. 5 parts of this compound were dissolved in 120 parts of 0.5 N aqueous hydrochloric acid and hydrogenated with hydrogen gas under pressure after the addition thereto of palladium supported on barium sulfate as the hydrogenation catalyst. In the course of about 1 hour, one mole of hydrogen was absorbed. The solution was then filtered to free it from the catalyst, and concentrated by evaporation. During the concentration there was obtained from 4.0 to 4.5 parts of pure L-glucosaminehydrochloride, which product crystallized out immediately. This constituted a yield of about 65–74% of the theoretical yield. Further quantities of the L-glucosaminehydrochloride product were obtained from the mother liquor after removal of the by-product ammonium chloride therefrom.

EXAMPLE 11

N-methyl-1-glucosaminonitrile was prepared using, for example, the method of Wolfram et al., J.A.C.S., 68 (1946), page 2343 et seq. This method involves reacting L-arabinose, methyl-amine and liquid hydrocyanic acid by the procedure therein described, to produce N-methyl-1-glucosaminic acid nitrile.

This reaction product was then subjected to catalytic hydrogenation. Five parts of the compound were dissolved in 120 parts of 0.5 N hydrochloric acid and, after the addition thereto of palladium supported on barium sulfate as the hydrogenation catalyst, introduction of hydrogen gas was continued until one mole of hydrogen had been absorbed. This required about one hour. After removal of the catalyst and concentration of the filtrate by heating, the main portion of by-product ammonium chloride produced during the reaction crystallized out and was filtered off.

The remaining solution was then evaporated to dryness, a dry residue being thus secured. To this residue there was then added 35 parts of pyridine and 40 parts of acetic anhydride. The mixture was allowed to stand for 24 hours at room temperature. Methanol was then added to the solution, whereupon there crystallized out, after concentration by heating, the pentaacetyl derivative of N-methyl-α-1-glucosamine in fine colorless needles, of melting point 160–161° C. The yield was about 60% of the theoretical. The pentaacetyl derivative thus secured was identical with the product prepared by Kuehl et al. by a more cumbersome process as described in J.A.C.S., 69 (1947), page 3032 et seq. Its optical rotation, identical with that of the product obtained by Kuehl et al., was: $[\alpha]_D^{22} = -98.3°$ (c.=1.37 in chloroform).

EXAMPLE 12

N-phenyl-1-glucosaminonitrile (melting point 148–150° C.) was prepared by the procedure which involved heating together 5 parts of l-arabinose, 3.15 parts of aniline and 9 parts of absolute ethyl alcohol. Heating was continued for from 10 to 15 minutes on a steam bath. The solution was then allowed to cool to room temperature, and 3.5 parts of anhydrous hydrocyanic acid were added.

Five parts of N-phenyl-1-glucosaminonitrile, prepared as described, were suspended in 100 parts of 0.5 N hydrochloric acid. After addition of a hydrogenation catalyst comprising palladium supported on barium sulfate, the compound was hydrogenated with hydrogen gas. After removal of the catalyst by filtration and concentration, as in Example 10, 1-glucosaminehydrochloride was secured in good yield, this product being the same as that obtained by the procedure described in Example 10.

In preparing the intermediate product which was subjected to hydrogenation, p-toluidine or naphthylamine, for example, may be used in place of aniline.

We claim:

1. The process of preparing 2-desoxy-2-amino sugars and their N-acetylated derivatives which comprises subjecting the reaction product secured by the reaction of a reducing sugar, hydrocyanic acid and a compound of the general formula NH$_2$X wherein X is selected from the group which consists of hydrogen and alkyl, aralkyl and aryl groups to the action of a hydrogenating agent in an aqueous reaction medium wherein acid conditions are maintained.

2. The process of preparing N-methyl-glucosamine hydrochloride which comprises hydrogenating N-methyl-1-glucosaminic acid nitrile in the presence of water and under acid conditions.

3. The process of preparing N-methyl-glucosamine hydrochloride which comprises reacting L-arabinose, methylamine and liquid hydrocyanic acid thereby forming the nitrile of N-methyl-1-glucosaminic acid, and catalytically hydrogenating said compound in the presence of water and under acid conditions with hydrogen gas, thereby forming N-methyl glucosamine hydrochloride.

4. The process of preparing L-glucosamine which comprises subjecting the reaction product of L-arabinose, hydrocyanic acid and a compound of the general formula NH$_2$X wherein X is selected from the group which consists of hydrogen and alkyl, aralkyl and aryl groups to hydrogenation under acid conditions and in the presence of water.

5. The process of preparing the pentaacetyl derivative of N-methyl-α-L-glucosamine which comprises catalytically hydrogenating N-methyl-L-glucosaminic acid nitrile in the presence of hydrogen chloride and water; and treating the resulting product with acetic anhydride.

6. The process of preparing the pentaacetyl derivative of N-methyl-α-L-glucosamine which comprises catalytically hydrogenating N-methyl-L-glucosaminic acid nitrile in the presence of hydrogen chloride and water; and treating the product resulting with acetic anhydride in the presence of pyridine as an acid acceptor.

7. The process of preparing 2-desoxy-2-amino-D-galaheptose hydrochloride which comprises catalytically hydrogenating in the presence of water and under acid conditions the reaction product of D-galactose, hydrocyanic acid and a compound selected from the group which consists of ammonia and the primary alkyl, aryl and aralkyl amines.

8. The process of preparing galactosamine hydrochloride which comprises subjecting the reaction product of D-lyxose, hydrocyanic acid and a compound selected from the group which consists of ammonia and the primary alkyl, aryl and aralkyl amines to hydrogenation in the presence of water and under acid conditions.

9. The process of preparing galactosamine hydrochloride which comprises reacting 1-amino-D-lyxose with hydrocyanic acid and subjecting the reaction product to catalytic hydrogenation in the presence of water under acid conditions.

10. The process of preparing 2-desoxy-2-amino sugar derivatives which comprises reacting D-lyxose, hydrocyanic acid and a compound selected from the group which consists of ammonia and the primary alkyl, aryl and aralkyl amines and subjecting the reaction product to hydrogenation in the presence of water under acid conditions.

11. The process of preparing 2-desoxy-2-amino sugar derivatives which comprises reacting D-glucose, hydrocyanic acid and a compound selected from the group which consists of ammonia and the primary alkyl, aryl and aralkyl amines and subjecting the reaction product to hydrogenation in the presence of water under acid conditions.

12. The process of preparing 2-desoxy-2-amino sugar derivatives which comprises reacting D-galactose, hydrocyanic acid and a compound selected from the group which consists of ammonia and the primary alkyl, aryl and aralkyl amines and subjecting the reaction product to hydrogenation in the presence of water under acid conditions.

13. The process of preparing 2-desoxy-2-amino sugar which comprises catalytically hydrogenating, under acid conditions and in the presence of water, the reaction product secured by reacting a reducing sugar selected from the group which consists of L-arabinose, D-lyxose, D-xylose, 3-β-D-galactosido-D-arabinose, D-galactose and D-glucose with hydrocyanic acid and a compound having the general formula NH$_2$X wherein X is selected from the group which consists of hydrogen and alkyl, aralkyl and aryl groups.

14. The process of preparing 4-O-β-D-galactopyranosyl-N-acetyl-D-glucosamine which comprises oxidizing lactose to 3-O-β-D-galactopyranosyl arabonic acid; hydrogenating said compound, thereby forming 3-O-β-D-galactopyranosyl-D-arabinose; reacting said compound with hydrocyanic acid and a compound selected from the group consisting of ammonia, primary alkyl amines, primary aryl amines and primary aralkyl amines, thereby forming 4-O-β-D-galactopyranosyl-D-glucosamine nitrile; hydrogenating said compound in the presence of water under acid conditions, thereby forming 4-O-β-D-galactopyranosyl-D-glucosamine; and acetylating said compound to form 4-O-β-D-galactopyranosyl-N-acetyl-D-glucosamine.

15. The process of preparing 4-O-β-D-galactopyranosyl-N-acetyl-D-glucosamine which comprises treating lactose with bromine, thereby forming lactobionic acid; oxidizing said compound to 3-O-β-D-galactopyranosyl-D-arabinose; reacting said compound with hydrocyanic acid and a compound selected from the group consisting of ammonia, primary alkyl amines, primary aryl amines and primary aralkyl amines, thereby forming 4-O-β-D-galactopyranosyl-D-glucosamine nitrile; hydrogenating said compound in the presence of water under acid conditions, thereby forming 4-O-β-D-galactopyranosyl-D-glucosamine; and acetylating said compound to form 4-O-β-D-galactopyranosyl-N-acetyl-D-glucosamine.

16. The process of preparing 4-O-β-D-galactopyranosyl-N-acetyl-D-glucosamine which comprises reacting N-phenyl-3-β-D-galactopyranosyl-D-arabinosylamine with hydrocyanic acid; catalytically hydrogenating the reaction product in the presence of 2 N aqueous hydrochloric acid and in the presence of a noble metal hydrogenation catalyst; and acetylating the resulting reduced product to form 4-O-β-D-galactopyranosyl-N-acetyl-D-glucosamine.

17. The process of preparing 4-O-β-D-galactopyranosyl-N-acetyl-D-glucosamine which comprises reacting N-benzyl-3-β-D-galactopyranosyl-D-arabinosylamine with hydrocyanic acid; catalytically hydrogenating the reaction product with gaseous hydrogen in an aqueous, acidic medium and in the presence of palladium oxide as catalyst; and acetylating the resulting reduced product to form 4-O-β-D-galactopyranosyl-N-acetyl-D-glucosamine.

18. In the process of preparing 4-O-β-D-galactopyranosyl-N-acetyl-D-glucosamine by reduction, under acid conditions and in the presence of water, of the addition product of 3-O-β-D-galactopyranosyl-D-arabinose, hydrocyanic acid and a compound selected from the group consisting of ammonia and primary alkyl, aryl and aralkyl amines, folowed by acetylation of the reduced product, the steps which include converting lactose to lactose oxime by reacting it with hydroxylamine; reacting said lactose oxime with acetic anhydride, thereby forming octaacetyl-lactobionic acid nitrile; and reacting said compound with a sodium alkylate, thereby forming 3-O-β-D-galactopyranosyl-D-arabinose.

References Cited in the file of this patent

Pigman: Carbohydrate Chemistry, Academic Press, N.Y., N.Y., 1948, pp. 415 and 416.